United States Patent [19]

Thulin

[11] 4,075,359
[45] Feb. 21, 1978

[54] METHOD OF FORMING PERFORATED FLAT DOUGH PIECES

[75] Inventor: Robert R. Thulin, Friendswood, Tex.

[73] Assignee: Nabisco, Inc., East Hanover, N.J.

[21] Appl. No.: 732,191

[22] Filed: Oct. 14, 1976

[51] Int. Cl.² .................. A21C 11/10; A21C 11/12; A21D 6/00

[52] U.S. Cl. .................................. 426/502; 426/503; 426/512; 426/517; 426/518; 425/89; 425/291; 83/9; 83/11

[58] Field of Search .............. 426/503, 512, 514, 517, 426/518, 479, 496, 502, 76; 425/89, 290, 291, 215, 216, 217, 223, 440, 436 RM; 83/6, 7, 9, 11, 103, 104, 105

[56] References Cited

U.S. PATENT DOCUMENTS

| 689 | 4/1838 | Heagle | 425/291 |
|---|---|---|---|
| 9,434 | 10/1880 | Parr | 425/216 |
| 1,279,641 | 1/1918 | Boudreau, Jr. | 425/216 |
| 1,563,314 | 12/1925 | Atanay | 425/89 |
| 1,747,954 | 2/1930 | Rydberg | 425/291 |
| 1,942,398 | 1/1934 | Fowler | 425/216 |
| 2,144,720 | 1/1939 | Gibson | 426/503 |
| 2,813,033 | 11/1957 | Schneider | 425/89 |
| 3,448,696 | 6/1969 | Verhoeven | 426/503 |
| 3,689,280 | 9/1972 | Werner | 426/512 X |
| 3,770,358 | 11/1973 | Steels et al. | 425/291 |

FOREIGN PATENT DOCUMENTS

| 1,151,473 | 7/1963 | Germany | 425/215 |

*Primary Examiner*—S. Leon Bashore
*Assistant Examiner*—Steve Alvo
*Attorney, Agent, or Firm*—Gerald Durstewitz

[57] ABSTRACT

The method of forming flat dough pieces for producing flat perforated crackers by placing a thin continuous sheet of cracker dough on a fabric belt and cutting the dough with a die which cuts circles in the dough sheet and simultaneously presses the cut out dough sections against the fabric belt with sufficient force to cause them to adhere thereto. The die also cuts the dough sheet into longitudinal strips and scores the strips to define individual product pieces. The dough strips are lifted off the fabric belt and thus separated from the cut out dough sections which are subsequently removed from the belt by a scraping blade.

9 Claims, 13 Drawing Figures

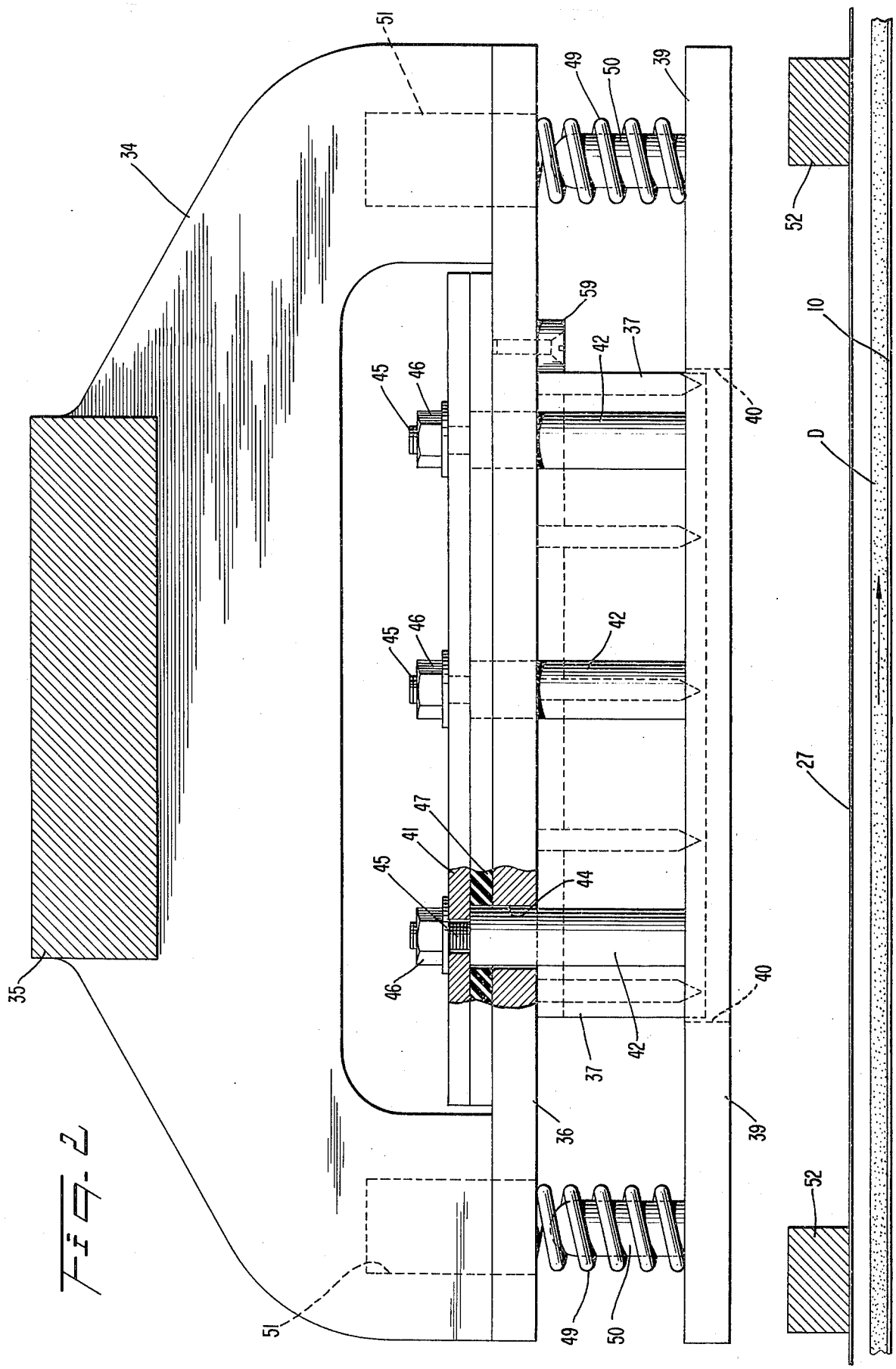

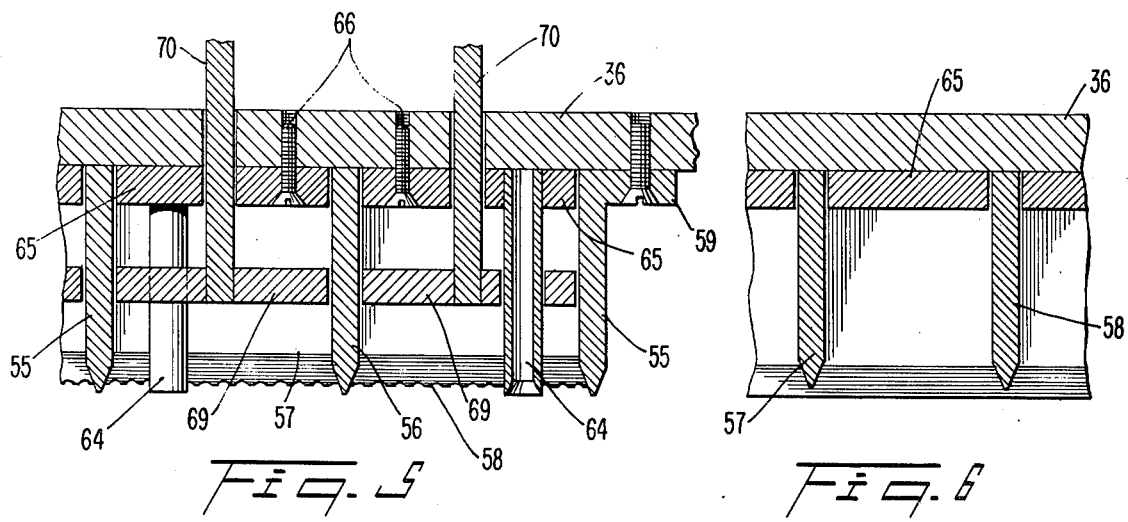
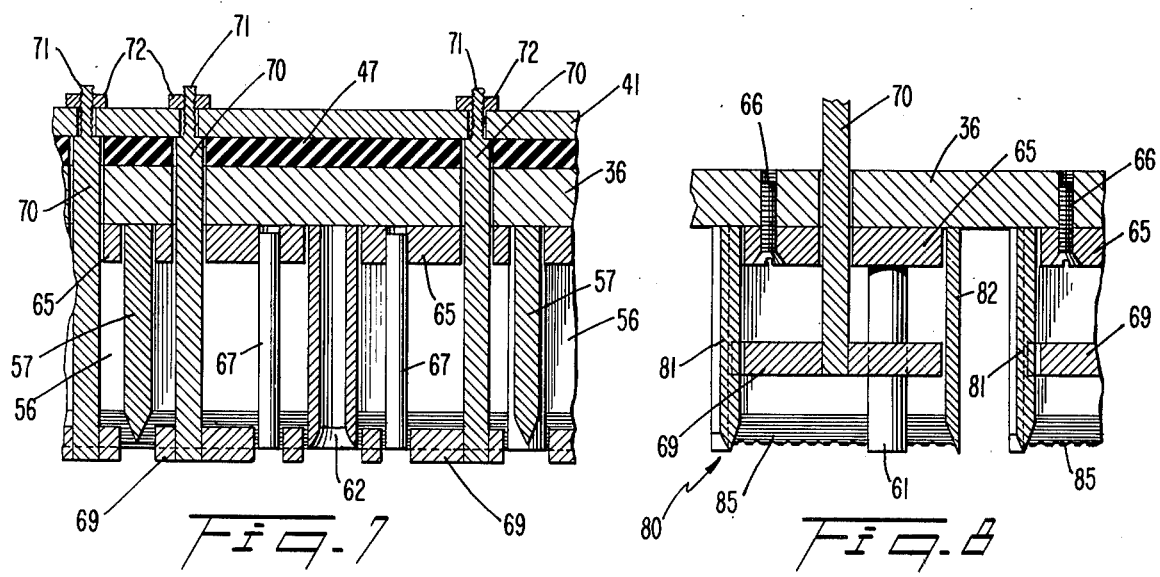
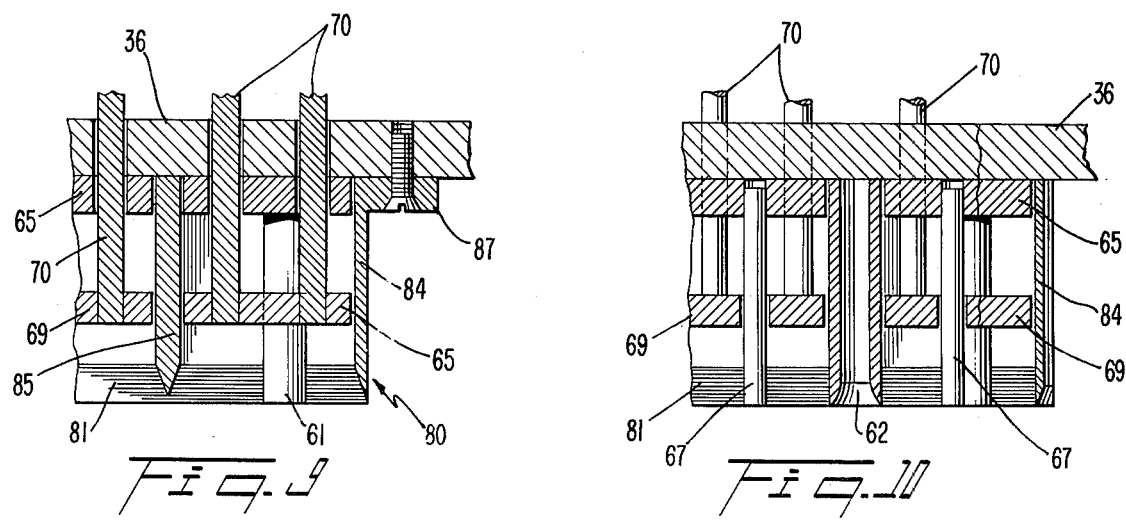

METHOD OF FORMING PERFORATED FLAT DOUGH PIECES

BACKGROUND OF THE INVENTION

The present invention relates to the forming of dough pieces, and more particularly, to the forming of perforated flat dough pieces for use in producing baked goods.

SUMMARY OF THE INVENTION

It is an object of the present invention to provide simple and efficient means for forming perforated flat dough pieces.

The object of the invention is accomplished by cutting out sections of a continuous dough piece carried on a conveyor in such a manner that the cut out sections are pressed against and adhere to the conveyor to permit easy separation of the dough pieces from the cut out sections.

BRIEF DESCRIPTION OF THE DRAWINGS

A preferred embodiment of the invention has been chosen for purposes of illustration and description, and is shown in the accompanying drawings, forming a part of the specification, wherein:

FIG. 2 is a sectional view of the die head.

FIG. 5 is a sectional view taken along line 5—5 on FIG. 3 showing the die head in the dough cutting condition.

FIG. 6 is a sectional view taken along line 6—6 on FIG. 3 with the inner stripping plates removed.

FIG. 7 is a sectional view taken along line 7—7 on FIG. 3 showing the die head in its non-operated condition.

FIG. 8 is a sectional view taken along line 8—8 on FIG. 4 with inner stripping plates removed.

FIG. 9 is a sectional view taken along line 9—9 on FIG. 4 with inner stripping plates removed.

FIG. 10 is a sectional view taken along line 10—10 on FIG. 4 with inner stripping plates removed.

DESCRIPTION OF THE PREFERRED EMBODIMENT

Figure 1:
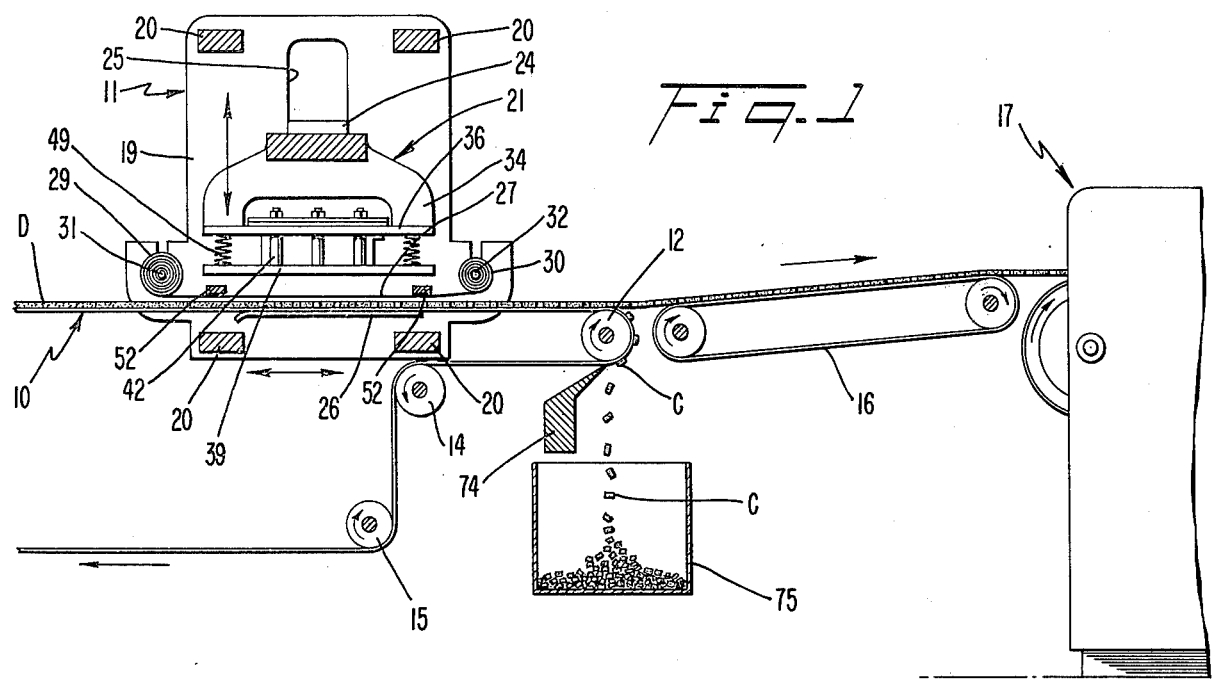
FIG. 1 is a schematic view illustrating the general arrangement employed in practicing the present invention.

Referring now to the drawings in detail, and particularly to FIG. 1 thereof, there is shown the output end of a cotton fabric conveyor belt 10 which extends from a dough sheeting operation (not shown) and passes beneath a reciprocating cutter 11. The output end of the belt 10 passes around a noser roll 12 and around rollers 14 and 15 which space the lower return flight of the belt from the upper delivery flight. A sheet of cracker dough D carried by the upper flight of the conveyor belt is cut and perforated, as disclosed hereinafter in detail, by the cutter 11 and transferred to a conveyor 16 and thence to a band oven 17.

The cutter 11 includes a pair of vertical plate members 19 interconnected by transverse bars 20. The cutter 11 is mounted on pivoted legs (not shown) and is reciprocated horizontally parallel to the belt 10. A die head 21 carrying a die is mounted between the plates 19 for vertical reciprocating movement. The die head 21 is provided with a slide block 24 that is slideably positioned in a vertical slot 25 formed in each of the plate members 19.

The reciprocating motions of cutter 11 are such that the die head 21 is moved horizontally at the velocity of the conveyor belt 10 during the time the die is in engagement with the dough sheet D.

A back-up plate 26 is positioned below the upper flight of the belt 10 where the die is forced through the dough sheet. A thin rubber web 27 extends parallel with the belt 10 a short distance above the upper flight of the conveyor. The web 27 extends from a supply roll 29 to a take-up roll 30 the rolls 29 and 30 being respectively wound around a pair of rods 31 and 32 that extend between the plates 19. In the preferred embodiment, the web 27 is a latex rubber sheeting of between 6 and 9 thousandths of an inch in thickness.

As the die moves downwardly, it engages the rubber web and moves it toward the dough sheet. When the die is pressed into the dough sheet, the dough forces the web to stretch and conform to the contours of the die. Upon upward movement of the die, the web contracts to its original flat configuration and insures positive separation of the cut dough from the die face. When the cutting edges on the die face begin to cut through the rubber web, the rods 31 and 32 are manually rotated to bring a fresh section of web under the die.

Referring to FIGS. 1 and 2, the die head 21 is mounted between the slide blocks 24 by means of a plurality of arc formations 34 joined to a bar 35 which is carried by the blocks. A bolster plate 36 is bolted to the arc formations 34 and a cutter blade grid 37 is bolted to the bottom of the bolster 36. Below the bolster is positioned an outer stripping plate 39 formed with a large central opening 40 through which the cutter grid moves during the cutting operation. The stripping plate 39 is suspended from a backing plate 41 positioned over the bolster. A plurality of studs 42 extend upwardly from the outer edges of the stripping plate through holes 44 in the bolster. The holes 44 are clear holes; i.e., they are sized to allow unimpeded axial movement of the studs. The upper ends of the studs are formed with threaded portions 45 of reduced diameter which pass through holes in the back plate. The back plate is fastened to the studs by means of nuts 46. A rubber pad 47 is positioned between the bolster and the back plate at each end of the die head. The stripping plate is biased away from the bolster by a coil spring 49 at each corner of the die head. Each spring is mounted on a rod 50 extending upwardly from the stripping plate and has its upper end seated in a bore 51 extending upwardly through the bolster into the arc formation 34.

As the die head 21 approaches the conveyor 10, the stripping plate engages stop members 52 mounted on the plates 19. The vertical motion of the stripping plate and the backing plate is thereby stopped while the bolster continues to move downwardly against the action of the springs 49 and presses the cutter into the dough sheet.

As shown in FIGS. 3, 5, 6 and 7, the cutter blade grid 37 comprises a number of parallel cutting blades 55 and 56 and a number of parallel scoring blades 57 and 58 intersecting the cutting blades at right angles to form an openwork grid. The cutting blades extend longitudinally with respect to the conveyor 10 and the scoring blades extend transversely thereof. The grid 37 is provided with tabs 59 extending from the edge blades for attachment to the bolster.

At the trailing end of each of the outer cutting blades, a short cutting blade 60 extends inwardly to provide synchronizing mark cuts in the dough sheet at the leading edge of the next dough section to move under the cutter. If the leading scoring blade does not strike the dough sheet at the synchronizing marks, the horizontal speed of the cutter 11 is adjusted until synchronization is achieved.

Figure 3:
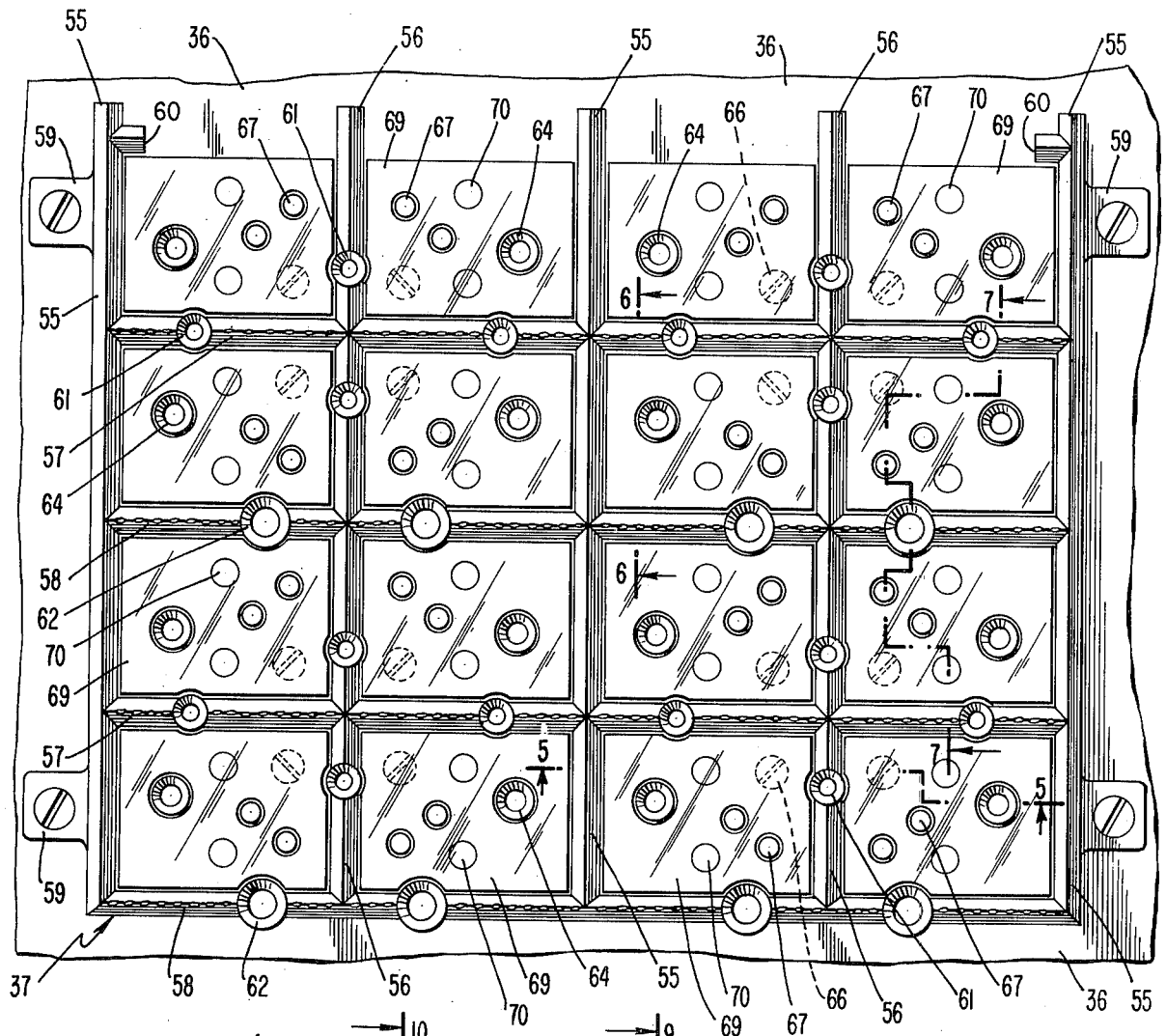
FIG. 3 is a plan view of the dough engaging face of a die according to the present invention.
Figure 4:
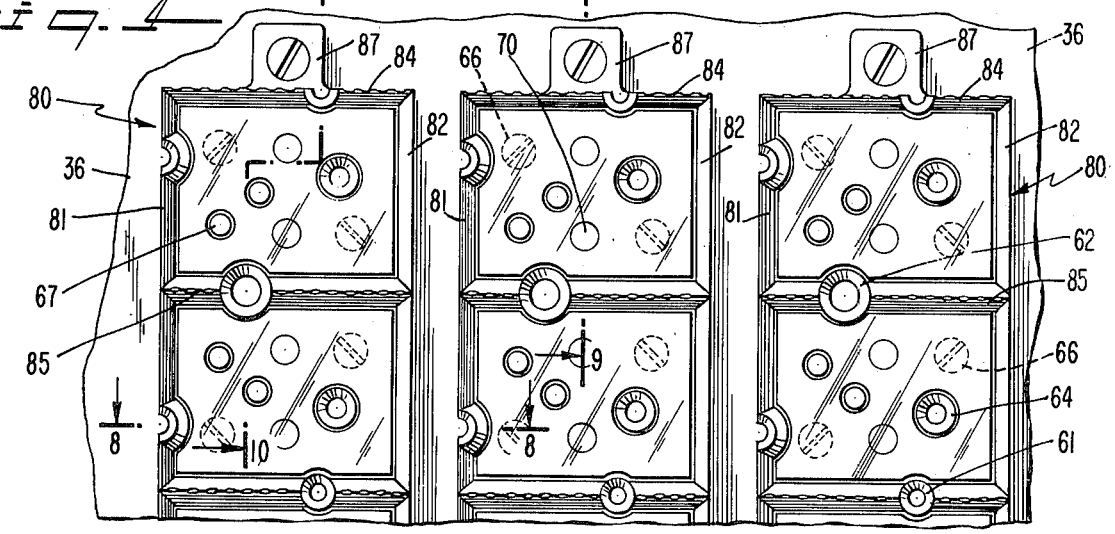
FIG. 4 is a plan view of the dough engaging face of a portion of a modified die arrangement.

As shown in FIG. 3, each cutting blade 56 and each scoring blade 57 is provided with small diameter cutter tubes 61 and each scoring blade 58 is provided with larger diameter cutter tubes 62. The cutter tubes 61 and 62 provide perforations in the dough sheet on the junction lines of adjacent cracker dough pieces and thus, form semicircular notches in the edges of each cracker.

Additional cutter tubes 64 are mounted in anchor plates 65 which fit within the openings in the openwork grid and are screwed to the bolster plate by screws 66. Each anchor plate 65 is formed with a large hole into which the tubes 64 are pressed and two smaller holes into which solid docker pins 67 are pressed. An internal stripping plate 69 is positioned below each of the anchor plates. The stripping plates are each mounted on a pair of rods 70 which extend through clear holes in the anchor plates 65 and the bolster. The rods 70 are each formed with a small diameter threaded end section 61 which extends through a hole in the backing plate 41 and receives a nut 72 to lock the stripping plate 69 to the backing plate 41. The length of the rods 70 is such that the inner stripping plates 69 extend slightly below the edge of the blades, as shown in FIG. 7, when the outer stripping plate 39 is at its maximum spacing from the bolster as shown in FIG. 2. Since the inner stripping plates 69 are rigidly connected to the outer stripping plate 39 through the backing plate, the cutter blade grid 37 moves downwardly with respect to the inner stripping plates (as shown in FIG. 5) subsequent to the engagement of the outer plate 39 with the stop members 52.

Figure 11:
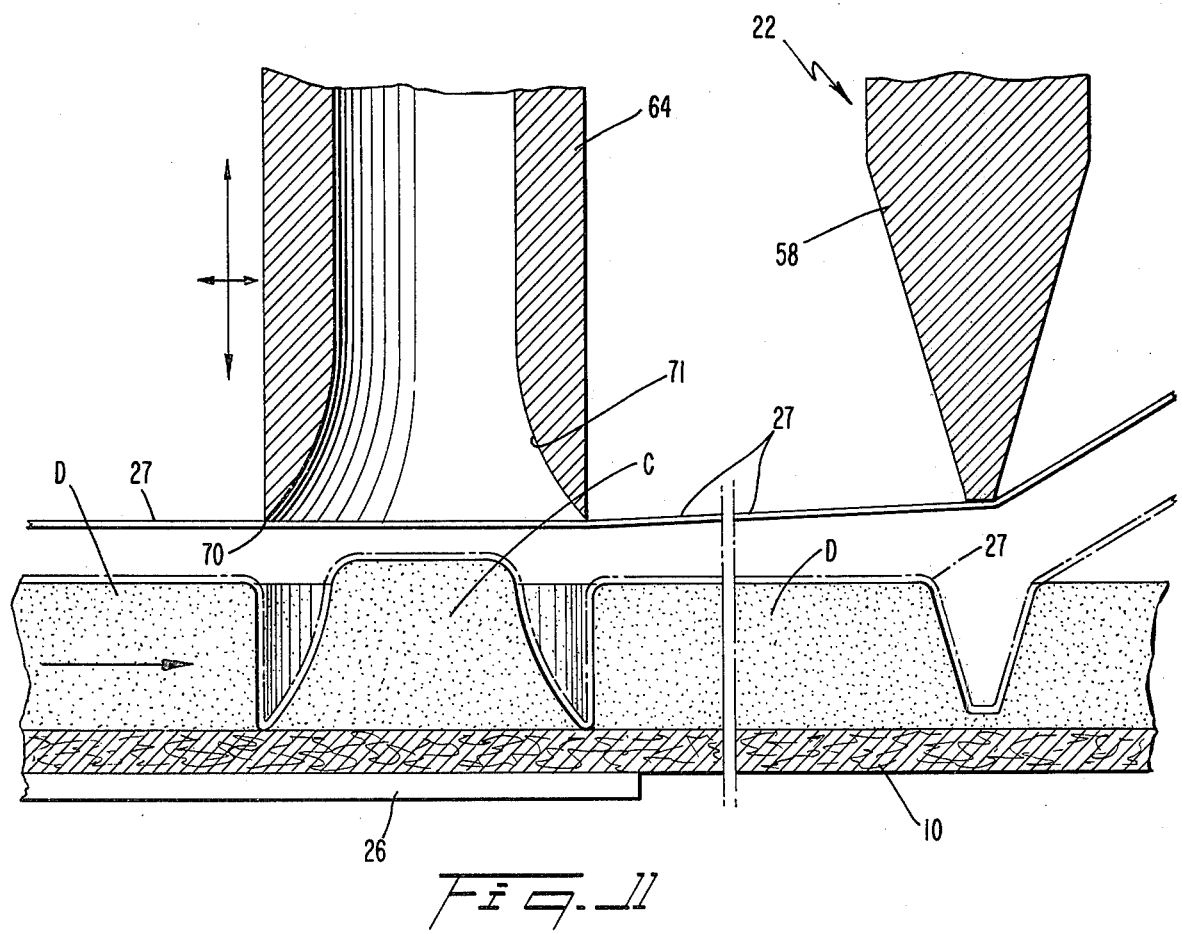
FIG. 11 is a longitudinal sectional view of a portion of the die and of the dough sheet immediately after the die has cut a circular dough section from the dough sheet.

As shown in FIG. 11, the cutter tubes are constructed with a circular cutting edge 70 formed at the outer edge of the end of the tube. The wall thickness of the tube is about 1/16 inch and tapes rapidly at the lower end to form the cutting edge. In the tapered portion, the inner surface of the tube describes, in cross section, a convex art portion 71 subtends an angle of about 20 degrees with the outer wall of the tube.

As the cutter tubes are pressed into the dough during a cutting operation, the surface 71 of each tube presses the dough beneath it downwardly and displaces it inwardly to form an upraised mound C of dough. The mound C is circular in plan view and is effectively severed from the dough sheet D. The downward pressure exerted by the surface 71 against the mound forces the dough tightly against the fabric belt and causes it to adhere firmly thereto.

During the cutting stroke, the rubber sheet 27 is stretched (by contact with the dough sheet) to conform to the countour of the cutting elements thus preventing the dough from adhering to the cutting elements. The position of the rubber sheet, at this time, is shown by the dashed line in FIG. 11. As the cutting blade grid is raised, the sheet 27 provides a downward biasing force upon the dough sheet as it (sheet 27) contracts.

As the blade grid 37 moves upwardly, it passes through the outer stripping plate 39 and the cutting edges of the blades move past the bottom surfaces of the inner stripping plates 69. In the event that the dough sheet sticks to the grid 37 (for example, in the event the sheet 27 is cut through), the stripping plates 39 engage the upper surface of the dough sheet and separate it from the grid.

The cutting blades 55 and 56 cut completely through the dough and divide the dough sheet into longitudinal strips. The scoring blades 57 and 58 cut only part way through the dough to maintain an interconnection between individual cracker dough pieces in each strip. In the preferred embodiments, the scoring blades are 0.020 inch shorter than the cutting blades, and the cutting tubes are 0.010 inch longer than the cutting blades.

Figure 12:
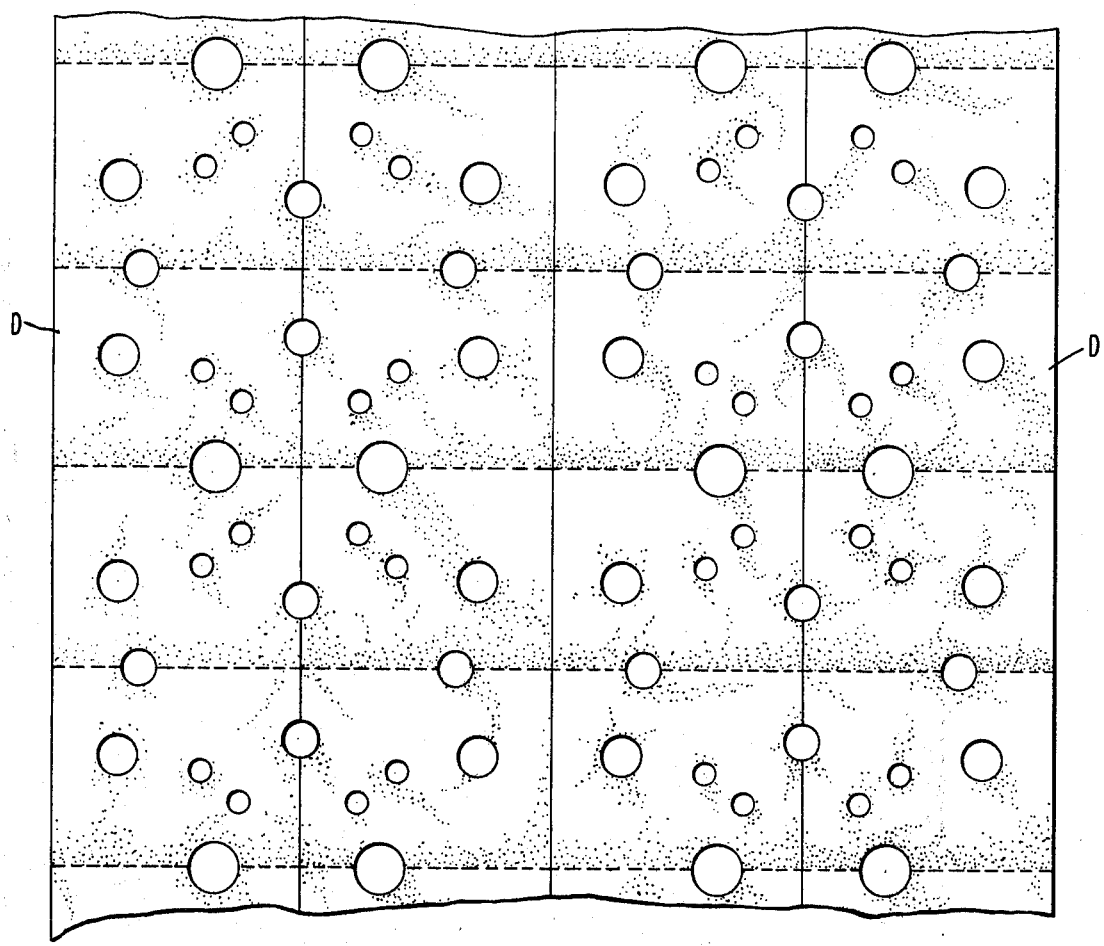
FIG. 12 is a top plan view of a section of perforated dough sheet formed by the die elements of FIG. 3.
Figure 13:
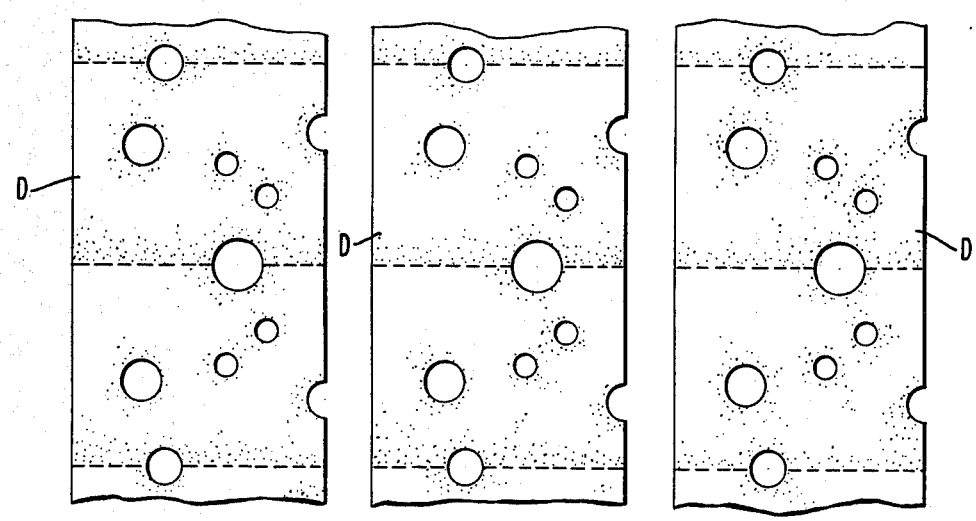
FIG. 13 is a top plan view of several perforated dough strips formed by the die elements of FIG. 4.

The dough strips (shown in FIG. 12) are transferred to the conveyor 16 and pass through the oven 17. After baking, the strips are broken into individual crackers in the conventional manner by breaking wheels.

The circular cut out dough sections C adhere to the conveyor 10 and are separated from the dough sheet as the conveyor passes around the noser roll 12. A scraping blade 74 is positioned against the conveyor band at the bottom of the roll 12 to remove the dough sections C. A container 75 is provided for the collection of the dough sections which are recycled and blended into subsequent dough batches.

A modified die arrangement is shown in FIGS. 4 and 8 to 10 wherein three blade strip grids 80 are substituted for the grid 37. The strip grids 80 extend lengthwise of the dough sheet to cut the sheet into continuous longitudinally extending strips. The grids 80 are spaced so that a strip of scrap is formed between the product strips. The scrap strips are removed so that edges of the product strips are fully exposed during baking to promote browning along the edges of the product strips.

The strip grids 80 are each composed of a pair of parallel cutting blades 81, 82 and a plurality of transverse scoring blades 84, 85. The blades 81 are formed to include half tubes 86 for notching one edge of the product strips. The blades 82 have a straight knife edge to produce a straight edge on the other side of the product strips. The scoring blades 84 and 85 are formed identically with segments of the blades 57 ad 58 respectively of the grid 37. The strip grids are fastened to the bolster by means of tabs 87. In all other respects, the die head 21 equipped with strip grids, contains all of the same elements previously described and operates in the same manner.

It will be seen from the foregoing that the present invention provides simple and efficient means for forming flat dough pieces for the production of perforated crackers and like products.

I claim:

1. The method of forming a continuous flat dough piece subdivided to define individual product pieces and having perforations of substantial size formed in the product pieces comprising the steps of forming a continuous flat dough sheet, transporting the dough piece on a belt of a material to which the dough will adhere in response to pressure, moving cutting elements through said dough to subdivide the sheet to define individual product pieces and simultaneously cut out sections of dough and press the cut out sections to the belt with sufficient force to cause adhesion thereto, separating the dough piece from the belt without disturbing the cut out sections thus providing perforations in the flat dough piece, and then removing the cut out sections from the belt, each dough section cut out of said product pieces being cut out by a tubular cutting element having an inner and outer wall and a cutting edge defined by the junction of the outer wall and an inclined surface that extends inwardly and upwardly from the cutting edge into the inner wall so as to force the dough inwardly by the inclined surface of the cutting edge downwardly and inwardly to cause the dough section to adhere to the conveyor.

2. The method of claim 1 wherein the cut dough piece is transferred from said belt to a second belt so that said cut out dough sections adhering to the first mentioned belt are moved away from the dough piece as it transfers to the second belt.

3. The method of claim 1 wherein said cutting elements include cutting blades for cutting the dough sheet into at least one longitudinal product strip and scoring blades transverse of said cutting blades for scoring the strips to define the individual product pieces.

4. The method of claim 3 wherein at least some of the cut out sections are cut in the dough sheet across lines defining the individual product pieces to form notches in the edges of the product pieces.

5. The method of claim 4 wherein other of said cut out sections are cut in the dough piece within the bounds of the individual product pieces.

6. The method of producing baked product strips according to the method of claim 3 wherein said dough sheet is cut to provide longitudinal product strips which are spaced from each other by a strip of scrap dough, including the steps of removing said scrap dough strip from between adjacent product strips, and baking the product strips whereby the exposed edges of the product strips brown.

7. The method of claim 1 wherein the inclined surface curves smoothly from said cutting edge into said inner wall of the tube.

8. The method of claim 1 wherein the inclined surface subtends an angle of about 20° with the outer wall at the cutting edge.

9. The method of claim 1 wherein the dough piece is cut into strips by knife blades which are effectively shorter than the tubular cutting elements, and the dough strips are scored by scoring blades which are effectively shorter than the knife blades.

* * * * *